(Model.)
S. WEST.
ORNAMENTAL GLASS AND PROCESS OF ETCHING THE SAME.
No. 261,885. Patented Aug. 1, 1882.
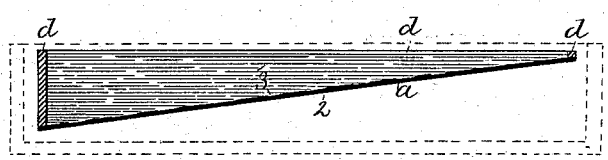
Witnesses,
Fred A. Powell
Jos. P. Livermore
Inventor.
Samuel West.
by Crosby & Gregory
attys.

UNITED STATES PATENT OFFICE.

SAMUEL WEST, OF BOSTON, MASSACHUSETTS.

ORNAMENTAL GLASS AND PROCESS OF ETCHING THE SAME.

SPECIFICATION forming part of Letters Patent No. 261,885, dated August 1, 1882.

Application filed May 5, 1882. (Model.)

*To all whom it may concern:*

Be it known that I, SAMUEL WEST, of Boston, county of Suffolk, State of Massachusetts, have invented an Improvement in Ornamental Glass and Process of Etching the Same, of which the following description, in connection with the accompanying drawings, is a specification.

My invention relates to colored glass and the process of manufacturing the same for decorative purposes, and is shown embodied in an etched flash-plated glass.

Heretofore glass flash-plated or having a thin layer of colored glass upon a body of transparent glass or glass of a different color has been ornamented by etching or eating away by acids portions of the colored glass, leaving the remaining portions in relief upon the transparent ground. In etching the glass it is coated with wax or suitable material not affected by the acid, and this coating has heretofore either been printed on certain portions of the glass or laid on through the openings of a stencil, or when the best work is desired the entire surface of the glass is coated, and the portions that are to be acted upon by the acid have the coating subsequently removed by the operator. When printing or stencil-work is resorted to the effect is stiff and mechanical, and when the entire surface is coated and portions of the said coating removed the process is a very slow and expensive one, requiring great skill. In all these prior processes the wax has usually been made liquid for the purpose of applying it to the surface by dissolving it in some suitable fluid, the solvent being evaporated out after the solution has been applied to the glass.

I have discovered that by warming or gently heating the glass to a temperature slightly below the melting-point of wax pure wax can be applied in a molten state by a brush or other implement, it being laid on in substantially the same way as a pigment or wash of color, and consequently showing the free touch or sweep of the operator's hand, so that artistic effects can be produced with the same rapidity as they can be drawn or painted. By this method the melted wax can be sprinkled on the surface, producing, when the glass is etched, an effect like ordinary spatter-work. As heretofore practiced, when the glass having portions of its surface provided with the protecting-covering has been exposed to the acid, the latter has been made to act uniformly over the entire unprotected surface, so that only two shades of color are produced—namely, that not affected by the acid, in contrast with that affected by the acid.

I have discovered that by placing the glass in the acid in such a manner that the latter stands at different depths over its different portions the effect of the said acid upon the glass is varied, it having a greater effect where it is deepest, and by thus exposing the glass to different depths of acid portions of it will be removed more rapidly than other portions, so that by removing the glass from the acid before the colored layer is wholly eaten away the portions of the said colored layer that have been acted upon will be of different thickness, thus producing a background for the portions that have not been affected by the acid at all of different shades, varying from clear white or transparent in the place where the acid has acted with sufficient effect to eat away the whole of the colored film to the portions where the acid has acted with the least effect, and where the film is consequently of nearly as great thickness, producing nearly as deep a tint of coloring as the portions protected by the covering of wax. By warming the glass, as described, before the melted wax is applied, the latter does not harden or set immediately upon touching the surface of the glass, and can consequently be spread or manipulated, as before described, by a brush after the manner of a paint.

Figure 1 of the drawings illustrates the method of exposing the glass to the action of the acid so that the latter will have a variable effect thereon, and Fig. 2 shows a plate etched in accordance with this invention.

The portions of the surfaces of the glass *a* that have been protected from the action of the acid are represented in black, the wax having been laid on, as shown at *b*, by freehand sweeps of a brush or suitable implement, and having been spattered on in the way colors are spattered, as shown at *c*. The plate *a* thus covered is placed in an inclined position, as shown in Fig. 1, in the acid, it either being wholly immersed in the acid contained in a vat, as indicated in dotted lines, in which case its entire under surface, 2, will be coated with the protecting material, so as to confine the action of the acid to the upper side, or it may be provided with suitable edges, $d$, to form the sides of the acid-vat, while the plate of glass itself forms the bottom thereof, as shown in full lines. In either case the acid stands at varying depths over the upper surface, 3, of the said glass, and it acts upon the latter with an effect varying with its depth, so that the uncovered portions of the glass will be removed or eaten away more rapidly in some places than in the others, as shown by the varying line-shading in Fig. 2.

The portion $e$ of the glass is that which has been subjected to the greatest depth of acid, and consequently nearly the entire colored portion of the glass that was not protected by the wax has been removed, leaving the transparent background to the said protected portions.

The portion $f$ of the glass has been acted upon by the least depth of acid, and consequently the film of colored glass is left of less thickness than that which was protected, but still of sufficient thickness to give a deep tinge of color as a background for the said portion which has not been affected at all, and it will be seen that the background varies with a regular gradation from the lightest portion, $e$, to the darkest portion, $f$, thus producing an entirely novel effect.

I claim—

1. That improvement in the art or method of etching glass which consists in warming the glass to a temperature somewhat below the melting-point of wax and spreading molten wax over only those portions of the surface that are to be protected from the action of the acid and then subjecting the glass to the action of acid, substantially as described.

2. That improvement in the art or method of etching glass which consists in subjecting the plate to the etching-acid in varying depth, whereby the different portions of its surface are affected with varying rapidity, substantially as described.

3. That improvement in the art or method of etching which consists in providing portions of the surface of the plate to be etched with a covering of wax, it being applied in a molten state by suitable implements manipulated by the hand of the operator and then subjecting the plate to the action of acid, substantially as described.

4. As an improved article of manufacture, an etched plate having the portions of its surface acted upon by the etching-acid removed to a gradually-varying depth, substantially as described.

In testimony whereof I have signed my name to this specification in the presence of two subscribing witnesses.

SAMUEL WEST.

Witnesses:
JOS. P. LIVERMORE,
B. J. NOYES.